April 20, 1926.
W. H. WAKFER
SWIVELING HEADLIGHT
Filed Jan. 19, 1925
1,581,253
2 Sheets-Sheet 1
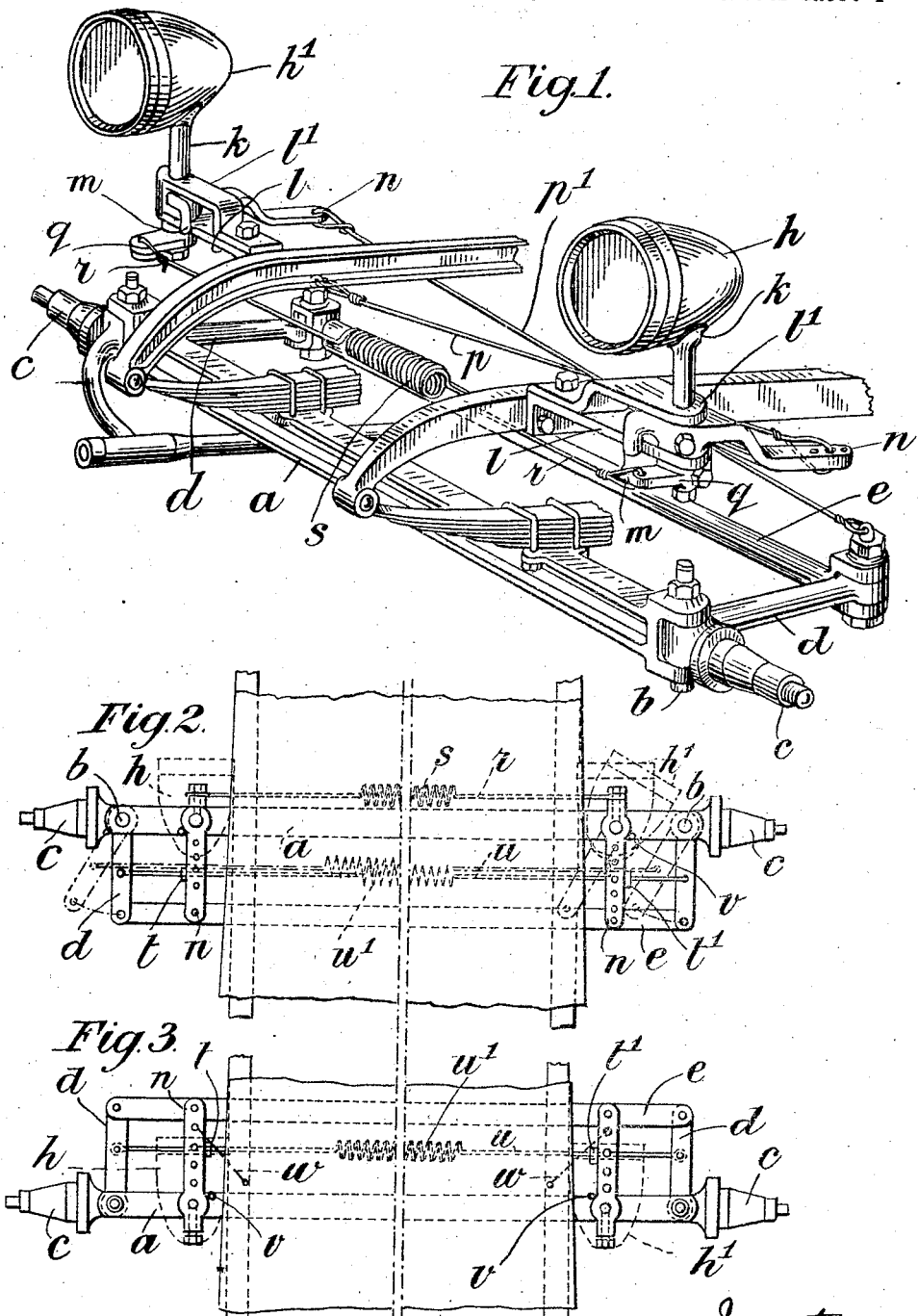

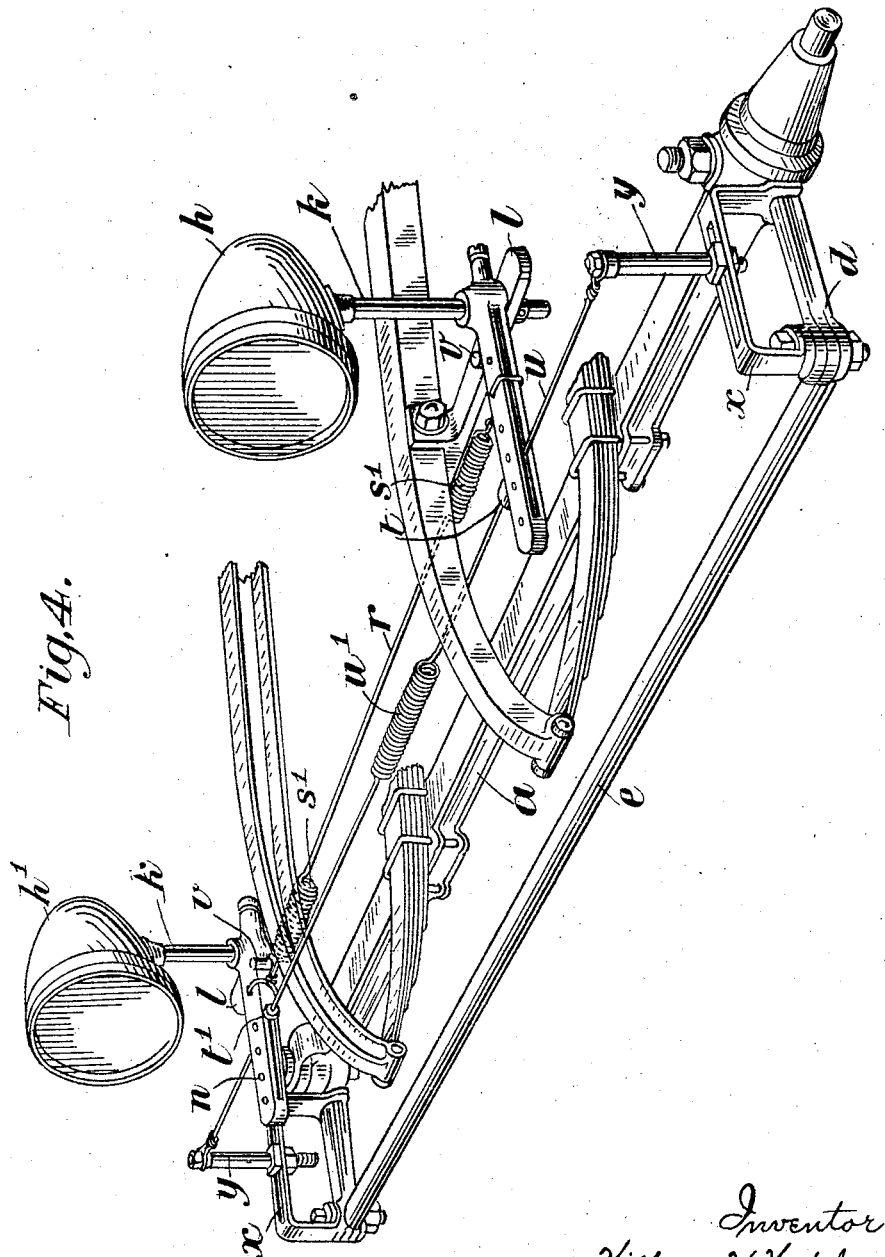

Patented Apr. 20, 1926.

1,581,253

UNITED STATES PATENT OFFICE.

WILLIAM HENRY WAKFER, OF SOUTH NORWOOD, ENGLAND, ASSIGNOR TO THE CORRECTA LIGHT COMPANY LIMITED, OF LONDON, ENGLAND, A BRITISH COMPANY.

SWIVELING HEADLIGHT.

Application filed January 19, 1925. Serial No. 3,396.

*To all whom it may concern:*

Be it known that I, WILLIAM HENRY WAKFER, a subject of the King of Great Britain, of No. 67 Whitworth Road, South Norwood, in the county of Surrey, England, have invented certain new and useful Improvements in Swiveling Headlights, of which the following is a specification.

This invention relates to swiveling head lights for steerable vehicles and is particularly concerned with that type of mechanism in which flexible connections are provided between the stems of the swiveling lamps and the steering gear of the vehicle in such a manner that the steering of the vehicle to the right or to the left effects the swiveling of one or other only of the head lamps, the other head lamp remaining in the normal or line ahead position.

The principal object of the invention is to provide arrangements in which the flexible connections are always tensioned and are not permitted to slacken during the steering and lamp swiveling operations.

A further object is to provide simple and efficient mechanisms, of the kind in question, capable of being applied readily to existing automobile constructions.

Yet another object is to adapt mechanism of the kind referred to whereby adjustments in the amplitude of lamp swiveling may be easily adjusted to produce a desired amplitube of swing in any given circumstance.

Finally, an object of the invention is to enable the mechanism to be adapted with facility for service on an automobile having the steering bar or rod either at the front of or in the rear of the front axle.

These and other objects will appear from the description hereinafter given with reference to drawings forming part of this specification, in which drawings:—

Figure 1 is a perspective view of an arrangement comprising a resilient flexible connection between the lamps on the two sides, the said connection being always in tension and serving for keeping the lamps normally in the line ahead position and for returning a swiveled lamp to that position at the conclusion of a steering operation.

Figure 2 is a diagram illustrating another mode of operating the lamps for swiveling one of them during a steering operation in one direction and the other of them during a steering operation in the opposite direction, the means for returning the lamps to the normal position being similar to those illustrated in Figure 1.

Figure 3 is a diagram similar to Figure 2 but in Figure 3 the steering bar is in front of the front axle instead of being as in Figure 2, behind the front axle. Moreover, Figure 3 shows a modified means for returning the lamps to the normal position after a steering operation.

Figure 4 is a perspective view of an arrangement corresponding with Figure 3 as regards the operation of the lamps but the means for returning the lamps to normal position after a steering operation are similar to those illustrated in Figures 1 and 2.

Referring to Figure 1, *a* is the front axle of a motor road vehicle having the usual knuckle joints *b* for pivotally connecting thereto the trunnion axles *c* on which the steering wheels are mounted. The trunnion axles *c* are turned about their pivots by means of short steering arms *d* connected therewith in the usual manner, these arms being connected by a cross bar or steering bar *e* extending across the vehicle.

*h h¹* are head lamps mounted to swivel on supports which may be of any suitable type mounted on any suitable part of the vehicle. For example, the lamps have depending stems *k* which may pass through holes or bearings in brackets or supports *l* on the chassis. On the stems *k* there are secured, as hereinafter described, stop arms *m* and operating arms *n*. In the example illustrated, the arms *m* and *n* are formed integrally on a common hub which is secured to the stems *k* so as to be capable of adjustment angularly or axially of such stems, but they need not necessarily be so mounted. The top of the said hub is engaged by an auxiliary bracket leaf *l¹*. The ends of the arms *m* may be covered by sleeves of rubber or other anti-concussive material. Or other buffering means may be adopted for the sake of silence and avoidance of wear. The lamps *h h¹* may be mounted in the positions shown, or they may be mounted with their stems *k* directly over and in vertical alignment with the pivot axes of the trunnion axles *c*.

The arm *n* of the lamp *h* which is on the left hand side of the vehicle is connected with the steering arm *d* at the right hand side by means of a flexible cord or wire *p* or by means of an elastic connection such as a spring or cord or wire length in which a spring is inserted. This connection is shown as being made with the pivot connection between the steering arm $d$ and the steering bar $e$, but such connection can be made at any suitable position on the steering arm or end portion of the steering bar $e$. The arm $n$ of the lamp $h^1$ on the right hand side of the vehicle is similarly connected by a cord, wire or the like $p^1$ with the arm $d$ or bar $e$ at or towards the left hand side of the vehicle.

If the vehicle is steered to the left, the motion of the opposite arm $d$ towards the right hand side sets up a pull on the cord or wire $p$ which, being transmitted to the arm $n$ at the left hand side causes the stem $k$ of the left hand lamp $h$ to turn so that the lamp $h$ follows the steering wheels in their leftward turning. The turning motion of the arm $d$ on the left hand side is towards the lamp $h^1$ on the right hand side and consequently the wire or cord $p^1$ simply slackens and the lamp $h^1$ remains in line ahead position, as will be readily understood. If the vehicle be steered to the right, it will be apparent that the cord $p^1$ will be pulled for turning the lamp $h^1$ rightwardly, the cord $p$ being meanwhile slackened and having no effect upon the lamp $h$ which remains in the line ahead position. The arms $n$ may be perforated at different points, as shown, for the connection thereof with the cords $p$ $p^1$. This allows the effective length of the arms to be altered so that the angle through which the lamps are turned can be varied merely by attaching the cords at the different points.

At the lower ends of the stems $k$ of the lamps there are secured short arms or lugs $q$ of any appropriate form and the lug $q$ on one side is connected with the lug $q$ on the other side of the vehicle by means of a cord, wire or rod $r$ which includes a tension spring $s$. This connection and the tension of the spring $s$ therein serves for keeping the stops $m$ of the two lamps hard against the bracket parts $l$ and thereby maintaining the lamps in the line ahead position when no steering is being done. The spring $s$ also serves to return each lamp to the line ahead position at the conclusion of a swiveling operation.

Naturally the arms, such as the arms $n$, need not be on the lamp stems but may be fixed on pins or vertical spindles operatively connected with the lamp stems. Thus, if desired, two lamps at each side of the vehicle may be turned by the mechanism instead of one only. Also in vehicles which steer from the rear axle such transmission from the arms $n$ to the lamp stems may be necessary.

In Figure 1 the steering bar $e$ is arranged behind the front axle $a$ but it will be understood, without special description that similar mechanism could be adopted with obvious modifications for operating the lamps in the manner described in those car constructions in which the steering bar $e$ is in front of the axle $a$.

In Figure 2 parts similar to those seen in Figure 1 are indicated by the same reference characters as are employed in Figure 1. In this modification, the arms $n$ are engaged by abutments $t$ $t^1$ secured on a connection $u$ extending from one steering arm $d$ to the other. The arms $n$ may be slotted in the horizontal plane or formed with eyes for the connector $u$ to pass through and it will be observed that the abutment $t$ lies against the outer edge of the left hand arm $n$ and that the abutment $t^1$ lies against the outer edge of the right hand arm $n$. If the vehicle is steered to the right hand, the arms $d$ swing to the dotted line position and the connector $u$ is carried bodily transversely of the vehicle, the abutment $t^1$ pressing leftwardly against the right hand arm $n$ and swiveling the right hand lamp. The transverse movement of the connector $u$, however, simply carries the abutment $t$ away from the left hand arm $n$ so that the left hand lamp remains in the line ahead position. The swiveling of the right hand lamp effects an extension of the spring $s$ as already described with reference to Figure 1, and the extended spring will subsequently effect the return of the right hand lamp to the line ahead position. Steering to the left with consequent swiveling of the left hand lamp and stationary condition of the right hand lamp will be apparent without further description. In Figure 2, the stop arms $m$ of Figure 1 are replaced by stop pins $v$ lying in the paths of respective arms $n$ as will be readily understood from the drawing. In the connector $u$ which may be of cord, wire, rod or the like, there is inserted tension spring $u^1$ which keeps the connector $u$ taut so that there is no sagging and no likelihood of this connector fouling any of the parts of the steering gear or other mechanism of the vehicle. If desired of course the spring may be inserted non-centrally of the connector and more than one spring may be employed.

In Figure 3, the steering bar $e$ being disposed forwardly of the front axle $a$ instead of in the rear thereof as in Figure 2, it is necessary for the abutments $t$ $t^1$ on the connector $u$ to be arranged in contact with the inner edges of respective arms $n$ instead of with the outer edges of such arms as described with reference to Figure 2. In this modification, the cross spring connection, common to the two lamps for returning each of them to the normal line ahead position, is dispensed with and in place thereof each of the arms $n$ is connected with any suitable point on the chassis by a spring connection indicated by the line $w$. These spring connections normally hold the arms $n$ against the stop pins *v* and maintain the lamps in the line ahead position, the appropriate one being extended when swiveling takes place and returning its lamp to normal at the conclusion of a swiveling operation.

In Figure 4, the cross connector *r* has two short springs *s¹* inserted in it near respective ends and is connected between the arms *n* for holding the latter normally against their respective stop pins *v* to maintain the lamps in the line ahead position. Also, the steering arms *d* and cross bar *e* being forwards of the front axle, as in Figure 3, the abutments *t t¹* are arranged to engage with the inner edges of respective arms *n*. This figure shows clearly the slotting of the arms *n* in the horizontal plane for the connector *u* to pass through. As the arms *n* will usually be at a higher elevation than the steering arms *d*, it is advantageous to provided slotted arm attachments *x* for the arms *d* and upstanding pins or pillars *y* adjustably fixed on the attachments *x* and serving as anchoring means for the ends of the connector *u*. It will be observed that the slotted arms *n* are perforated at a number of points at different distances from the pivot axes of these arms. A pin is dropped into a perforation, or is secured therein, at a desired distance from the pivot of the lamp stem *k* and in this way the distance of the connector *u* from the pivot at which the abutments *t t¹* operate can be varied. Thus, the amplitude of swiveling motion of the lamps for any given amplitude of steering motion can be varied in two ways. First, the pillers *y* may be adjusted along the attachments *x* and thereby change the amount of transverse motion of the connector *u* during a steering operation. Or the pillars *y* may be adjusted to a fixed position and thereafter changes in the amplitude of swiveling may be effected by altering the position of the pins aforesaid along the slotted arms *n* so as to cause the connector *u* to operate nearer to or farther from the pivot axes of the lamp stems as will be readily understood from Figure 4.

Thus, the tensioned cross connector of these improvements, whether employed for operating the lamps, or for maintaining them in normal position and returning them thereto, or for both of these purposes, provides an exceedingly simple means which is always taut and can never foul operative parts.

I claim:—

1. Swiveling lamp mechanism of the kind described for steerable vehicles comprising in combination swiveling lamp supports, lever arms on said supports said arms being adapted for the free passage of transmission means a resilient member situated in said transmission means and adapted for constantly maintaining said transmission means in tension, and abutments on said transmission means adapted for operatively engaging said arms, said transmission means being connected with the steering gear and adapted for bringing about the operation of one or other of the lamps during right hand or left hand steering substantially as set forth.

2. Swiveling lamp mechanism of the kind described for steerable vehicles comprising in combination swiveling lamp supports, a resilient tension connection between opposite side members of the steering gear, abutments on said resilient connection and in operative relation with respective lamp supports, and a resilient tension connection constantly tending to maintain said lamp supports in normal position substantially as set forth.

3. Swiveling lamp mechanism of the kind described for steerable vehicles comprising in combination swiveling lamp supports, a tensioned flexible connector, attachment devices for said connector said devices being adjustably mounted on the arms of the steering gear, abutments secured on said connector in operative relation with respective lamp supports, and resilient means constantly tending to maintain said lamp supports in normal position substantially as set forth.

4. Swiveling lamp mechanism of the kind described for steerable vehicles comprising in combination swiveling lamp supports slotted lever arms on said supports, a tensioned flexible connector passing freely through said slotted arms, attachment devices for said connector said atttachment devices being mountable upon arms of the steering gear, abutments secured on said connector in operative relation with lever arms of respective lamp supports, adjustable guide devices mounted in said lever arms and adapted for guiding the passage of the connector at pre-determined distances from the swiveling axes, and resilient means constantly tending to maintain said lamp supports in normal position substantially as described.

5. Swiveling lamp mechanism of the kind described for steerable vehicles comprising in combination swiveling lamp supports, slotted lever arms on said supports, a tensioned flexible connector passing freely through said slotted arms, attachment devices for said connector said attachment devices being mountable on arms of the steering gear, adjustments adapted for adjusting said attachment devices towards or from the pivots of the steering arms, abutments secured on said connector in operative relation with lever arms of respective lamp supports, adjustable guide devices mounted on said lever arms and adapted for guiding the passage of the connector at pre-determined distances from the swiveling axes, and resilient means constantly tending to maintain said lamp supports in normal position substantially as set forth.

WILLIAM HENRY WAKFER.